(12) United States Patent
Witten et al.

(10) Patent No.: US 10,560,448 B1
(45) Date of Patent: Feb. 11, 2020

(54) ONE-TOUCH SECURE ON-BOARDING OF OOB IOT DEVICES

(71) Applicant: Symantec Corporation, Mountain View, CA (US)

(72) Inventors: Brian Witten, Hermosa Beach, CA (US); Mingliang Pei, Palo Alto, CA (US); Damon Kachur, Folsom, CA (US)

(73) Assignee: Symantec Corporation, Mountain View, CA (US)

( * ) Notice: Subject to any disclaimer, the term of this patent is extended or adjusted under 35 U.S.C. 154(b) by 169 days.

(21) Appl. No.: 15/255,997

(22) Filed: Sep. 2, 2016

(51) Int. Cl.
  *G06F 21/00* (2013.01)
  *H04L 29/06* (2006.01)
  *H04L 9/32* (2006.01)
  *H04W 12/06* (2009.01)

(52) U.S. Cl.
  CPC ........ *H04L 63/0823* (2013.01); *H04L 9/3268* (2013.01); *H04L 63/10* (2013.01); *H04W 12/06* (2013.01)

(58) Field of Classification Search
  CPC ... H04L 63/0823; H04L 63/10; H04L 9/3268; H04W 12/06
  See application file for complete search history.

(56) References Cited

U.S. PATENT DOCUMENTS

| | | | | |
|---|---|---|---|---|
| 2014/0244001 | A1* | 8/2014 | Glickfield | H04L 67/16 700/33 |
| 2015/0269383 | A1* | 9/2015 | Lang | G06F 21/57 726/1 |
| 2016/0248746 | A1* | 8/2016 | James | H04W 4/70 |
| 2016/0366157 | A1* | 12/2016 | Smith | H04L 63/06 |
| 2017/0272317 | A1* | 9/2017 | Singla | H04L 41/0806 |

* cited by examiner

*Primary Examiner* — Kendall Dolly
(74) *Attorney, Agent, or Firm* — Holland & Hart LLP

(57) ABSTRACT

The present disclosure relates to systems and methods for on-boarding an out of the box (OOB) device so as to secure electronic control of the OOB device. In some embodiments, a method may be performed by a computing device having an electronic processor, and may include automatically electronically receiving, by a processor, an electronic request to on-board from the OOB device, and authenticating, by the processor, a standardized certificate associated with the OOB device. The method may further include obtaining, by the processor, a policy authority to electronically control the OOB device. The method may further include securing electronic control of the OOB device, by the processor, based at least in part on the obtained approval.

18 Claims, 9 Drawing Sheets

ONE-TOUCH SECURE ON-BOARDING OF OOB IOT DEVICES

BACKGROUND

Internet of Things (IoT) devices are proliferating rapidly, providing automated services related to security cameras, thermostats, remote control of a home, and other residential uses, as well as industrial control systems, interactive marketing kiosks, and the like. Yet even as the technology in these IoT devices continues to advance, the process for initiating control of these IoT devices out of the box (OOB)—often requiring manual user input and facilitation—has remained largely unchanged. Users are generally required to push one or more buttons on the IoT device to make the device "discoverable" for pairing, and must search for and download an appropriate application to their personal computer or mobile device, among other tedious steps, in order to on-board the device. Particularly in commercial settings, such as hotels, where a multitude of IoT devices may need to be on-boarded at once, this process may not be viable.

SUMMARY

Out of the box (OOB) device on-boarding protocols often require active user involvement, whether through pushing a button on an IoT device or scanning a QR code, or searching for and downloading an application for use with the device. As users increasingly bring IoT devices into residential and commercial settings, a need for a more efficient and simplified on-boarding process has arisen.

The present systems, methods, and techniques are designed to provide safe and secure on-boarding for OOB IoT devices, with minimal user input. This on-boarding protocol facilitates bringing OOB IoT devices under electronic control of one or more home or commercial automation systems, personal computing devices, local networks, or the like, without the need for significant user action.

Methods for electronically on-boarding an OOB device so as to secure electronic control of the OOB device. In some embodiments, the method may be performed by a computing device having an electronic processor. In some embodiments, the method may include automatically electronically receiving, by the processor, an electronic request to on-board from the OOB device. The method may further include authenticating, by the processor, a standardized certificate associated with the OOB device. The method may further include obtaining, by the processor, a policy authority to electronically control the OOB device. The method may further include securing electronic control of the OOB device, by the processor, based at least in part on the obtained approval.

In some embodiments, the request to on-board may be received by the processor from the OOB device over a network.

In some embodiments, automatically electronically receiving the electronic request to on-board from the OOB device may include electronically receiving a short-range broadcast from the OOB device. In some embodiments, the short-range broadcast may include a Bluetooth® or un-configured Wi-Fi signal.

In some embodiments, automatically electronically receiving the electronic request to on-board from the OOB device may further include: listening for the short-range broadcast at a universal application associated with the processor; electronically requesting from the OOB device, by the processor, the standardized certificate associated with the OOB device; and in response to the request for the standardized certificate, electronically receiving from the OOB device, by the processor, the standardized certificate.

In some embodiments, the standardized certificate may be included in the electronic request transmitted from the OOB device.

In some embodiments, authenticating the standardized certificate may include comparing the standardized certificate associated with the OOB device with a list of verified standardized certificates.

In some embodiments, obtaining the policy authority may include communicating, by the processor, a policy authority request to a user; and receiving, by the processor, approval of the policy authority request from the user.

In some embodiments, communicating the policy authority request to the user may include requesting that the user download an identified application associated with the OOB device.

In some embodiments, securing electronic control of the OOB device may include signing, at the processor, an assertion of electronic control of the OOB device; and communicating, from the processor, assertion of electronic control to the OOB device. In some embodiments, the assertion of electronic control may complete on-boarding the OOB device.

In some embodiments, on-boarding the OOB device may further include granting network access to the OOB device.

In some embodiments, securing electronic control of the OOB device may further include limiting operation of the OOB device to commands received via the processor.

An apparatus for electronically on-boarding an OOB device to electronic control is also described. In some embodiments, the apparatus may include a processor and a memory in electronic communication with the processor. The memory may store instructions executable by the processor to: automatically electronically receive an electronic request to on-board from the OOB device; authenticate a standardized certificate associated with the OOB device; obtain a policy authority to electronically control the OOB device; and secure electronic control of the OOB device based at least in part on the obtained approval.

A non-transitory computer-readable storage medium storing computer executable instructions is also described. In some embodiments, the computer executable instructions may be executed by a processor to cause the processor to perform the steps of: automatically electronically receive, by a processor, an electronic request to on-board from the OOB device; authenticate, by the processor, a standardized certificate associated with the OOB device; obtain, by the processor, a policy authority to electronically control the OOB device; and secure electronic control of the OOB device based at least in part on the obtained approval.

Features from any of the above-mentioned or below-described embodiments may be used in combination with one another in accordance with the general principles described here. These and other embodiments, features, and advantages will be more fully understood upon reading the following detailed description in conjunction with the accompanying drawings and claims. The following description provides examples and is not limiting of the scope, applicability, and/or examples set forth in the claims. Changes may be made in the function and/or arrangement of elements discussed without departing from the scope of the disclosure. Various examples may omit, substitute, and/or add various procedures and/or components as appropriate. For instance, the methods described may be performed in an order different from that described, and/or various steps may be added, omitted, and/or combined. Also, features described with respect to some examples may be combined in other examples.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

Figure 1:
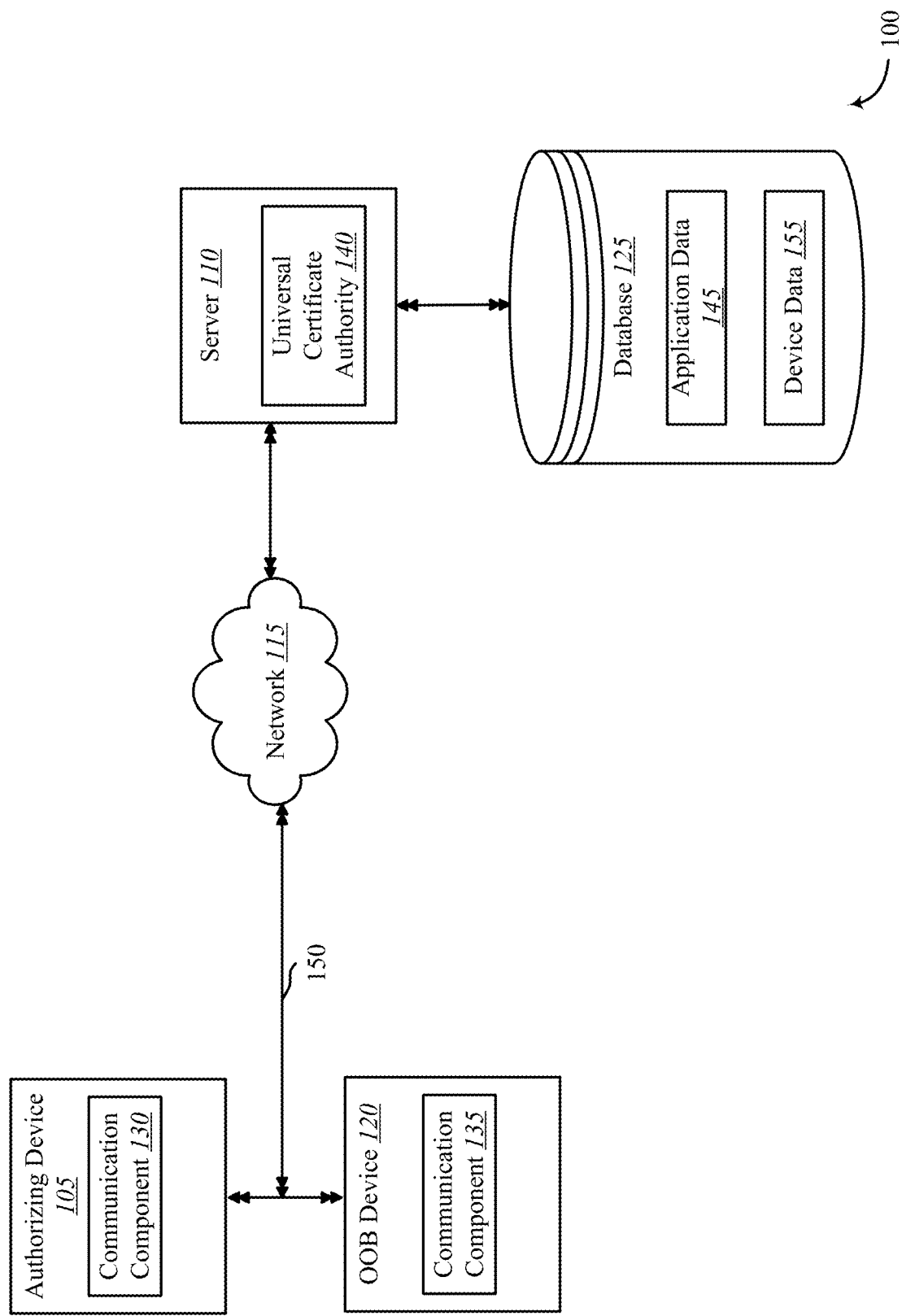
FIG. 1 is a block diagram illustrating embodiments in which the present systems and methods may be implemented, in accordance with various aspects of this disclosure.

While the embodiments described here are susceptible to various modifications and alternative forms, embodiments have been shown by way of example in the drawings and will be described in detail. However, the exemplary embodiments described here are not intended to be limited to the particular forms disclosed or to limit other forms disclosed and/or undisclosed. Rather, this disclosure covers all modifications, equivalents, and/or alternatives.

DETAILED DESCRIPTION

In some embodiments, the present systems, methods, and techniques relate to securely and efficiently on-boarding an IoT device upon initial activation of the device, in order to bring the device under electronic control of a processor associated with a personal computing device, home or commercial network or automation system, or the like.

FIG. 1 is a block diagram illustrating embodiments in which the present systems and methods may be implemented, in accordance with various aspects of this disclosure. FIG. 1 illustrates an example of a communications system 100 in accordance with various aspects of the disclosure. The communications system 100 may include authorizing device 105, server 110, network 115, OOB device 120, and/or database 125, among other components. Although described herein as an authorizing device 105, this term may be used broadly to include a mobile device, such as a smartphone, or may describe a control panel, for example as associated with a home or commercial automation or security system, or the like. The network 115 may provide OOB device authentication, encryption, access authorization, tracking, Internet Protocol (IP) connectivity, and other access, calculation, modification, and/or functions. The authorizing device 105 and the OOB device 120 may interface with the network 115 through a first set of wired and/or wireless communication links 150 to communicate with one or more local and/or remote servers 110.

The authorizing device 105 may include any PC or Mac computer, such as a computer, laptop, desktop, tablet, or the like. Additionally or alternatively, examples of authorizing device 105 may include any mobile device or smartphone, including a mobile device operating on a mobile device operating system. OOB device 120 may include any IoT device, such as a thermostat, camera, coffee machine, remote control, light, virtual reality headset, speaker, outlet plug, air quality monitor, keypad, oven control, watch, TV controller, or any other known IoT device suitable for electronic control. In some examples, the mobile device operating system on which the OOB device 120 operates may be the same operating system as that of the authorizing device 105, while in other examples, authorizing device 105 and OOB device 120 may operate on different but compatible operating systems. In some embodiments, the operating system may be a proprietary mobile operating system, such as iOS. In various examples, authorizing device 105 and OOB device 120 may communicate—either directly or indirectly (e.g., through network 115)—with each other over a second set of wired and/or wireless communication links 150. Wired connections may include, in some examples, USB connections, while wireless connections may include, in some examples, Wi-Fi connections. Authorizing device 105 may communicate with a backend server (such as the server 110) directly and/or indirectly using the first set of one or more communication links 150.

The authorizing device 105 may wirelessly communicate with OOB device 120, server 110, database 125, and/or other components via one or more antennas. Authorizing device 105 may provide communication coverage and/or other features for an area. In some examples, authorizing device 105 may be referred to as a control device, a base transceiver station, a radio base station, an access point, a radio transceiver, or some other suitable terminology. The communications system 100 may include authorizing devices 105 of different types. There may be overlapping geographic coverage areas for one or more different parameters, including different technologies, features, subscriber preferences, hardware, software, technology, and/or methods. For example, each authorizing device 105 may be related to one or more discrete structures (e.g., a home, a business) and each of the one more discrete structures may be related to one or more discrete areas. In other examples, multiple authorizing devices 105 may be related to the same one or more discrete structures (e.g., multiple devices relating to a home and/or a business complex).

One or more authorizing device 105 may be dispersed throughout the communications system 100 and each authorizing device 105 may be stationary and/or mobile. An authorizing device 105 may include a cellular phone, a personal digital assistant (PDA), a wireless modem, a wireless communication device, a handheld device, a tablet computer, a laptop computer, a cordless phone, a wireless local loop (WLL) station, a display device (e.g., TVs, computer monitors, etc.), a printer, a camera, and/or the like. An authorizing device 105 may also include or be referred to by those skilled in the art as a user device, a smartphone, a BLUETOOTH® device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable component and/or element.

The communication links 150 shown in communications system 100 may include uplink (UL) transmissions from one or more authorizing device 105 to one or more servers 110 and/or OOB device 120, and/or downlink (DL) transmissions, from one or more servers 110 and/or one or more OOB device 120 to one or more authorizing device 105. In some embodiments, a authorizing device 105 and/or OOB device 120 may communicate directly and/or indirectly with database 125 through one or more wired and/or wireless communication links 150. In some embodiments, one or more components may include one or more communication components (e.g., communication component 130, communication component 135, universal certificate authority 140, etc.). These communication components may be examples of a network interface card (MC), among other things. Communication components may facilitate direct and/or indirect wired and/or wireless communication to receive applications, changes, configuration information, some combination, and/or other information.

The downlink transmissions may also be called forward link transmissions while the uplink transmissions may also be called reverse link transmissions. Each of the communication links 150 may include one or more carriers, where each carrier may be a signal made up of multiple sub-carriers (e.g., waveform signals of different frequencies) modulated according to the various radio technologies. Each modulated signal may be sent on a different sub-carrier and may carry control information (e.g., reference signals, control channels, etc.), overhead information, user data, etc. The communication links 150 may transmit bidirectional communications and/or unidirectional communications. Communication links 150 may include one or more connections, including but not limited to, 345 MHz, Wi-Fi, BLUETOOTH®, BLUETOOTH® Low Energy, cellular, Z-WAVE®, 802.11, peer-to-peer, LAN, WLAN, Ethernet, fire wire, fiber optic, USB, and/or other connection types related to the present systems and methods.

In some embodiments of communications system 100, authorizing device 105 and/or OOB device 120 (among other components) may include one or more antennas for employing antenna diversity schemes to improve communication quality and reliability between authorizing device 105 and OOB device 120 and/or other elements, as an example. Additionally or alternatively, authorizing device 105, OOB device 120, and/or servers 110 (among other components) may employ multiple-input, multiple-output (MIMO) techniques that may take advantage of multi-path, mesh-type environments to transmit multiple spatial layers carrying the same or different coded data.

While authorizing device 105 and/or OOB device 120 may communicate with one or more components through one or more other components (e.g., communicate with database 125 through server 110), authorizing device 105 and/or OOB device 120 may also communicate directly with one or more other components via one or more direct communication links 150. Two or more of authorizing device 105 and/or OOB device 120 may also communicate via a direct communication link 150. Examples of direct communication links 150 may include Wi-Fi Direct, BLUETOOTH®, wired (including USB), and/or other P2P group connections. The authorizing device 105 and/or OOB device 120 in these examples may communicate according to the WLAN radio and baseband protocol including physical and MAC layers from IEEE 802.11, and its various versions including, but not limited to, 802.11b, 802.11g, 802.11a, 802.11n, 802.11ac, 802.11ad, 802.11ah, etc. In other implementations, other peer-to-peer connections and/or ad hoc networks may be implemented within communications system 100.

Authorizing device 105 may detect a request to on-board from the OOB device 120, for example via communication component 130, and via a wired or wireless communication link 150. Upon detecting the on-board request, authorizing device 105 may authenticate the validity of a standardized certificate associated with the OOB device, for example using a wired or wireless communication link 150 via network 115 to universal certificate authority 140 at server 110, to determine whether the OOB device may be trusted. In some examples, universal certificate authority 140 may compare the standardized certificate associated with the OOB device with a list of verified standardized certificates, as communicated from authorizing device 105 (for example using communication component 135), stored on database 125.

Server 110 may provide information relating to a standardized certificate associated with the OOB device directly and/or based on queries and/or communications with database 125. Database 125 may store application data 145 (including, but not limited to, identification of an application associated with the OOB device) and/or device data 155 (including, but not limited to, a list of verified standardized certificates associated with OOB devices), some combination, and/or other information.

Figure 2:
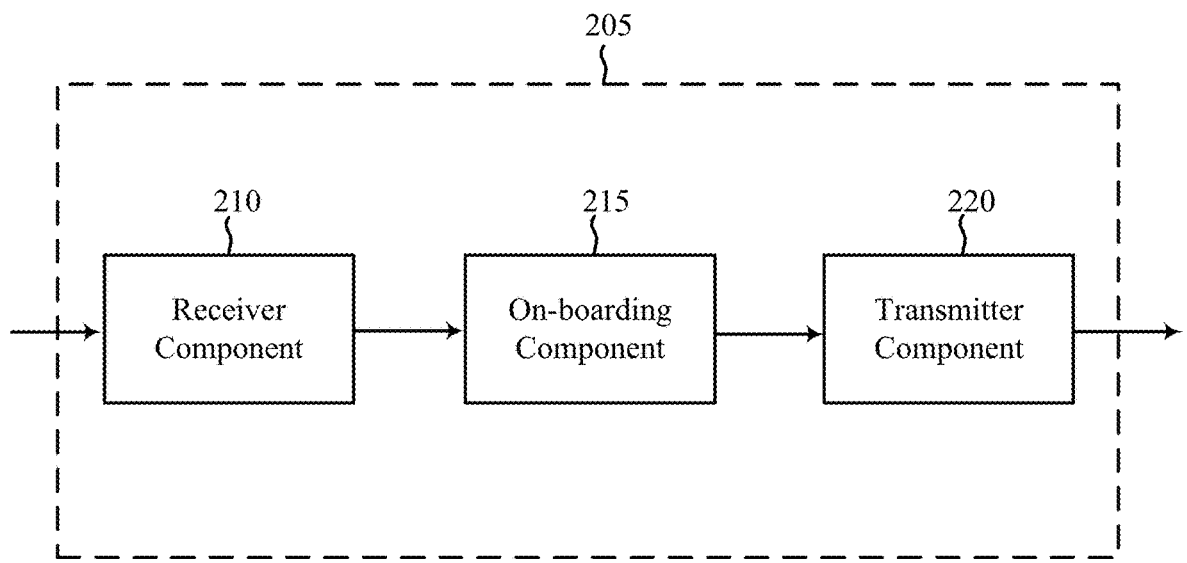
FIG. 2 is a block diagram illustrating embodiments in which the present systems and methods may be implemented, in accordance with various aspects of this disclosure.

FIG. 2 shows a block diagram 200 of a device 205 for use in on-boarding an OOB device to electronic control, in accordance with various aspects of this disclosure. The device 205 may be an example of one or more aspects of authorizing device 105 described with reference to FIG. 1, among others. The device 205 may include a receiver component 210, an on-boarding component 215, and/or a transmitter component 220. Each of these components may be in communication with each other—directly and/or indirectly.

The components of the device 205 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each component may also be implemented—in whole or in part—with instructions embodied in memory formatted to be executed by one or more general and/or application-specific processors.

The receiver component 210 may electronically receive information such as data packets, user data, on-boarding requests, and/or control information associated with various information channels (e.g., control channels, data channels, etc.). The receiver component 210 may be configured to detect or electronically receive a request to on-board from an OOB device, and any on-boarding information associated with the requesting OOB device, by a processor over a network. Information may be passed on to the on-boarding component 215, and to other components of the device 205.

In some embodiments, on-boarding component 215 may receive information from receiver component 210 and/or another element of device 205 (such as those discussed with respect to FIG. 1, among others). On-boarding component 215 may perform one or more operations relating to the present system, methods, and techniques relating to on-boarding an OOB device to electronic control. On-boarding component 215 may receive information relating to and/or may itself perform operations relating to on-boarding an OOB device to electronic control by device 205 and/or one or more applications, and/or other capabilities, some combination of these, and/or other techniques.

The transmitter component 220 may electronically transmit, by a processor over a network, the one or more signals received from other components of the device 205. The transmitter component 220 may transmit instructions, applications, programs, information, settings, actions, data, some combination, and/or other information to one or more other devices, servers, computing units, databases, some combination, and/or other elements and/or components. In some examples, the transmitter component 220 may be collocated with the receiver component 210 in a transceiver component.

Figure 3:
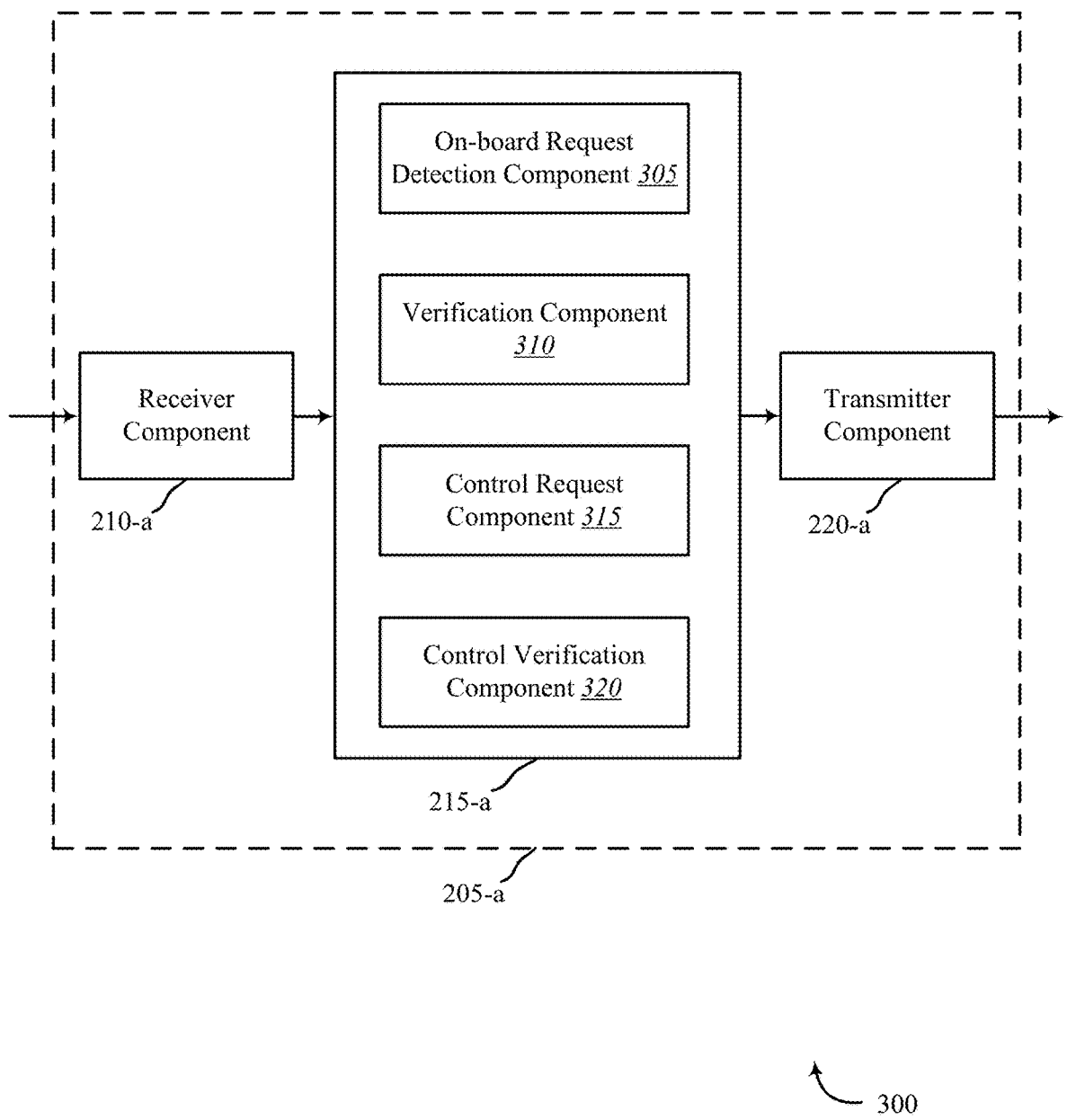
FIG. 3 is a block diagram illustrating embodiments in which the present systems and methods may be implemented, in accordance with various aspects of this disclosure.

FIG. 3 shows a block diagram 300 of a device 205-a for use in on-boarding an OOB device to electronic control, in accordance with various examples. The device 205-a may be an example of one or more aspects of an authorizing device 105, described with reference to FIG. 1, among others. The device 205-a may include a receiver component 210-a, an on-boarding component 215-a, and/or a transmitter component 220-a, each of which may be examples of the corresponding components of device 205. The device 205-a may also include a processor. Each of these components may be in communication with each other and/or other elements. The on-boarding component 215-a may include an on-board request detection component 305, a verification component 310, a control request component 315, or a control verification component 320, or some combination, and/or other components relating to the present systems, methods, and techniques. The receiver component 210-a and the transmitter component 220-a may perform the functions of the receiver component 210 and the transmitter component 220, of FIG. 2, respectively.

The components of the device 205-a may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each component may also be implemented—in whole or in part—with instructions embodied in memory formatted to be executed by one or more general and/or application-specific processors.

In some embodiments, on-boarding component 215-a may include an on-board request detection component 305. This on-board request detection component 305 may be part of on-boarding component 215-a, may be separate from on-boarding component 215-a, and/or may work in conjunction with other elements and/or components of device 205-a, among others. On-board request detection component 305 may perform one or more operations relating to automatically electronically receiving an electronic request to on-board from an OOB device, such as OOB device 120 as described with reference to FIG. 1, at device 205-a. For example, on-board request detection component 305 may identify that device 205-a has received a short-range broadcast from the OOB device, the short-range broadcast including a Bluetooth or un-configured Wi-Fi signal. In some examples, on-board request detection component 305 may passively detect or receive a short-range broadcast from the OOB device, while in other examples, on-board request detection component 305 may actively listen for the short-range broadcast, for example at a universal application associated with device 205-a.

In some embodiments, on-boarding component 215-a may include a verification component 310. This verification component 310 may be part of on-boarding component 215-a, may be separate from on-boarding component 215-a, and/or may work in conjunction with other elements and/or components of device 205-a, among others. Verification component 310 may perform one or more operations relating to authenticating the validity of a standardized certificate associated with the requesting OOB device. For example, in accordance with various aspects of the present techniques, verification component 310 may detect a standardized certificate conveyed by the OOB device along with the request to on-board received at on-board request detection component 305. Verification component 310 may compare the received standardized certificate associated with the requesting OOB device with a list of verified standardized certificates. In some examples, the list of verified standardized certificates may be stored locally at device 205-a, while in other examples, verification component 310 may communicate the received standardized certificate to a remote server or database, such as server 110 or database 125 described with respect to FIG. 1, for comparison with a list of verified standardized certificates stored at the remote server or database.

Each OOB device may be associated with a device certificate designated by a trusted manufacturer, and authorized by a universal certificate authority. The device certificate may act as a cryptographic key to provide identification information associated with the OOB device for use during on-boarding. The device certificate may be embedded in the OOB device by the manufacturer at the time the OOB device is fabricated. Unlike many known certificates designated by manufacturers, the standardized certificate may be linked to the universal certificate authority to ensure consistency and standardization across a plurality of OOB devices and manufacturers.

In some embodiments, on-boarding component 215-a may include a control request component 315. This control request component 315 may be part of on-boarding component 215-a, may be separate from on-boarding component 215-a, and/or may work in conjunction with other elements and/or components of device 205-a, among others. Control request component 315 may perform one or more operations relating to on-boarding an OOB device to electronic control, among other things. For example, upon receiving confirmation from verification component 310 that the standardized certificate associated with the requesting OOB device is verified, control request component 315 may present a policy authority request for electronic control of the OOB device to a user. For example, where device 205-a is an example of an authorizing device 105 as described with respect to FIG. 1, control request component 315 may display a policy authority request to the user via a dedicated application on the user's personal computing device. In other examples, control request component 315 may communicate the policy authority request to the user at a computing device remote from device 205-a.

In some examples, the communicated policy authority request may include a request that the user download an identified application, where the application may be associated with the OOB device. For example, based at least in part on the standardized certificate received from the requesting OOB device, control request component 315 may identify the OOB device, and may further identify an appropriate application associated with the OOB device to enable electronic control over the OOB device. In an embodiment where the requesting OOB device is a thermostat, for example, control request component 315 may communicate a request to the user or to device 205-a to download a thermostat control application. As discussed in more detail above, in some examples the user may provide affirmative approval of the requested download, or may actively search for and download the application himself, while in other examples, device 205-a may approve the requested download or search for and download the application automatically, based on user inputted preferences or patterns derived based on user activity.

Control request component 315 may then receive approval of the policy authority request from the user. For example, where device 205-a is an example of a personal computing device, the user may tap a button or provide any other appropriate input to approve the policy authority request presented. In other examples, the policy authority request may be approved without direct user input, for example by comparing the policy authority request with a list of pre-approved policy authorities or associated OOB devices. These pre-approved policy authorities may be inputted by a user as preferences, or may be derived based on detected patterns of user approval.

In some embodiments, on-boarding component 215-a may include a control verification component 320. This control verification component 320 may be part of on-boarding component 215-a, may be separate from on-boarding component 215-a, and/or may work in conjunction with other elements and/or components of device 205-a, among others. Control verification component 320 may perform one or more operations relating to on-boarding an OOB device to electronic control, among other things. For example, control request component 315 may assert electronic control over the OOB device based at least in part on the received approval of the policy authority request from the user or otherwise received at device 205-a.

In some examples, asserting electronic control over the OOB device may include signing, at control verification component 320, an assertion of electronic control over the OOB device, and communicating the assertion of electronic control to the OOB device. This assertion of electronic control may thereby complete the on-boarding process of the OOB device to electronic control by device 205-a. In some examples, the OOB device may receive the signed assertion of electronic control from control verification component 320, and may return a signed acknowledgment of the assertion of electronic control. From that point forward, the OOB device may be commanded solely by device 205-a.

In some examples, a race condition may arise, in which a request to on-board from an OOB device is detected by more than one device 205-a, such that a "race" ensues to gain sole electronic control over the OOB device. In instances where another device, such as a neighbor's unauthorized device, takes unauthorized control of the OOB device, a user may have recourse to reset the OOB device and re-on-board the OOB device to control by device 205-a. For example, the OOB device may be queried to determine under whose electronic control the OOB device is operating. If the electronic control is not associated with the appropriate user, the user may request a factory reset from the manufacturer, and may provide verification of his right to electronic control by confirming that the standardized certificate associated with the OOB is consistent with that of the OOB device the user purchased, according to sales records or receipts. Upon such verification, the manufacturer may remotely reset the OOB device to factory, in-box settings, such that the user may reinitiate the on-boarding process of the OOB device to electronic control by device 205-a. This method is described in more detail below with respect to FIG. 7.

Figure 4:
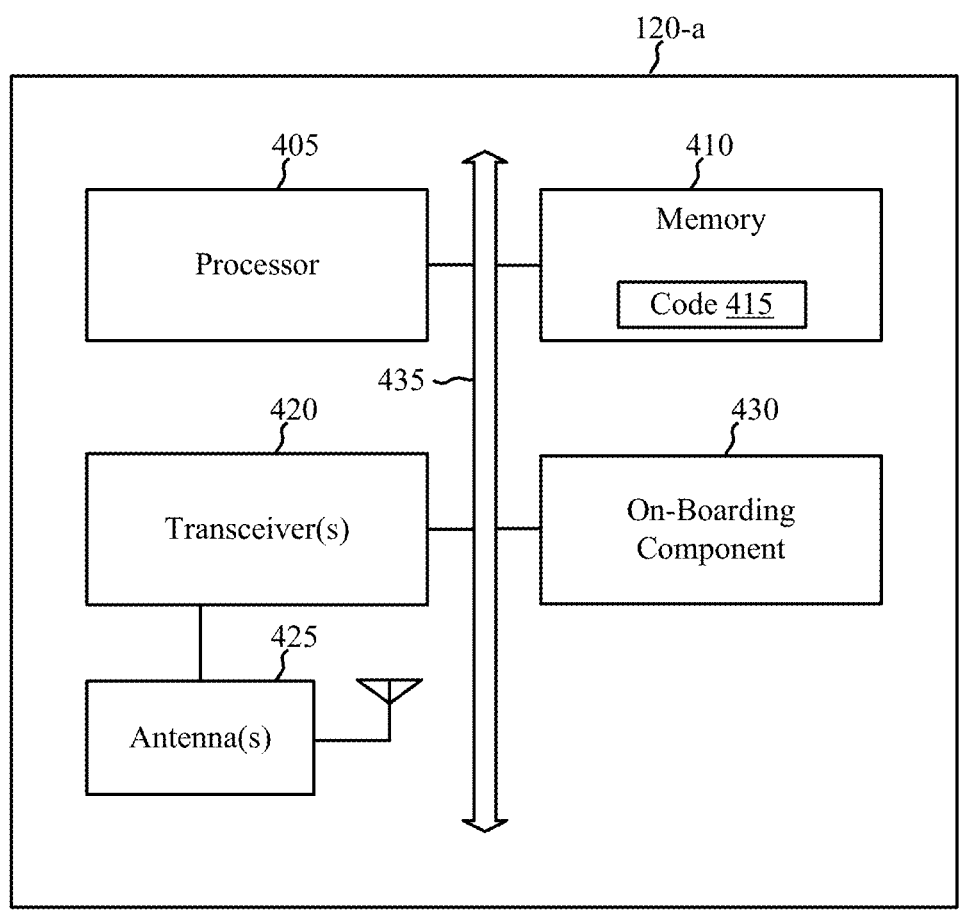
FIG. 4 is a block diagram illustrating embodiments in which the present systems and methods may be implemented, in accordance with various aspects of this disclosure.

FIG. 4 shows a block diagram 400 of an OOB device 120-a from which a request for on-boarding to electronic control may be received, in accordance with various aspects of the present disclosure. The OOB device 120-a may be included or be part of a personal computer (e.g., a laptop computer, a netbook computer, a tablet computer, etc.), a cellular telephone, a PDA, a DVR, an internet appliance, a gaming console, an e-reader, a vehicle, an Internet of Things (IoT) device, a home appliance, a lighting or alarm control system, etc. The OOB device 120-a may, in some examples, have an internal power supply (not shown), such as a small battery, to facilitate mobile operation. In some examples, the OOB device 120-a may be an example of aspects of one or more of the OOB device 120 described with reference to FIG. 1.

The OOB device 120-a may include a processor 405, a memory 410, at least one transceiver (represented by transceiver(s) 420), at least one antenna (represented by antenna(s) 425), or an on-boarding component 430. Each of these components may be in communication with each other, directly or indirectly, over one or more buses 435.

The memory 410 may include random access memory (RAM) or read-only memory (ROM). The memory 410 may store computer-readable, computer-executable code 415 containing instructions that are configured to, when executed, cause the processor 405 to perform various functions described herein related to on-boarding the OOB device 120-a to electronic control. Alternatively, the computer-executable code 415 may not be directly executable by the processor 405 but may be configured to cause the OOB device 120-a (e.g., when compiled and executed) to perform various of the functions described herein.

The processor 405 may include an intelligent hardware device, e.g., a central processing unit (CPU), a microcontroller, an ASIC, etc. The processor 405 may process information received through the transceiver(s) 420 or information to be sent to the transceiver(s) 420 for transmission through the antenna(s) 425. The processor 405 may handle, alone or in connection with the on-boarding component 430, various aspects of on-boarding the OOB device 120-a to electronic control by an authorized user device, such as device 205, 205-*a* described with respect to FIGS. 2 and 3.

The transceiver(s) 420 may include a modem configured to modulate packets and provide the modulated packets to the antenna(s) 425 for transmission, and to demodulate packets received from the antenna(s) 425. The transceiver(s) 420 may, in some examples, be implemented as one or more transmitters and one or more separate receivers. The transceiver(s) 420 may support broadcasting of an on-boarding request from the OOB device to any listening device, and may further support communication of a standardized certificate associated with the OOB device to any requesting device to facilitate on-boarding. The transceiver(s) 420 may be configured to communicate bi-directionally, via the antenna(s) 425, with one or more of the servers 110 described with reference to FIG. 1. While the OOB device 120-*a* may include a single antenna, there may be examples in which the OOB device 120-*a* may include multiple antennas 425.

The on-boarding component 430 may be configured to perform or control some or all of the device techniques or functions described with reference to FIG. 1 related to on-boarding the OOB device 120-*a* to electronic control. The on-boarding component 430, or portions of it, may include a processor, or some or all of the functions of the on-boarding component 430 may be performed by the processor 405 or in connection with the processor 405. For example, on-boarding component 430 may broadcast a short-range Bluetooth or un-configured Wi-Fi signal requesting initiation of on-boarding procedures. On-boarding component 430 may additionally communicate a standardized certificate associated with the OOB device 120-*a* with the on-boarding request broadcast, or separately in response to a request from the device to which the OOB device 120-*a* will be on-boarded. On-boarding component may be configured to receive an assertion of electronic control from the device to complete the on-boarding process.

In some embodiments, one of ordinary skill in the art will appreciate various other aspects and/or methods of on-boarding can be employed in light of and in conjunction with the present systems, methods, and techniques of this disclosure, including, but not limited to, techniques and/or practices of and/or relating to on-boarding an OOB device to electronic control and/or other methods.

Figure 5:
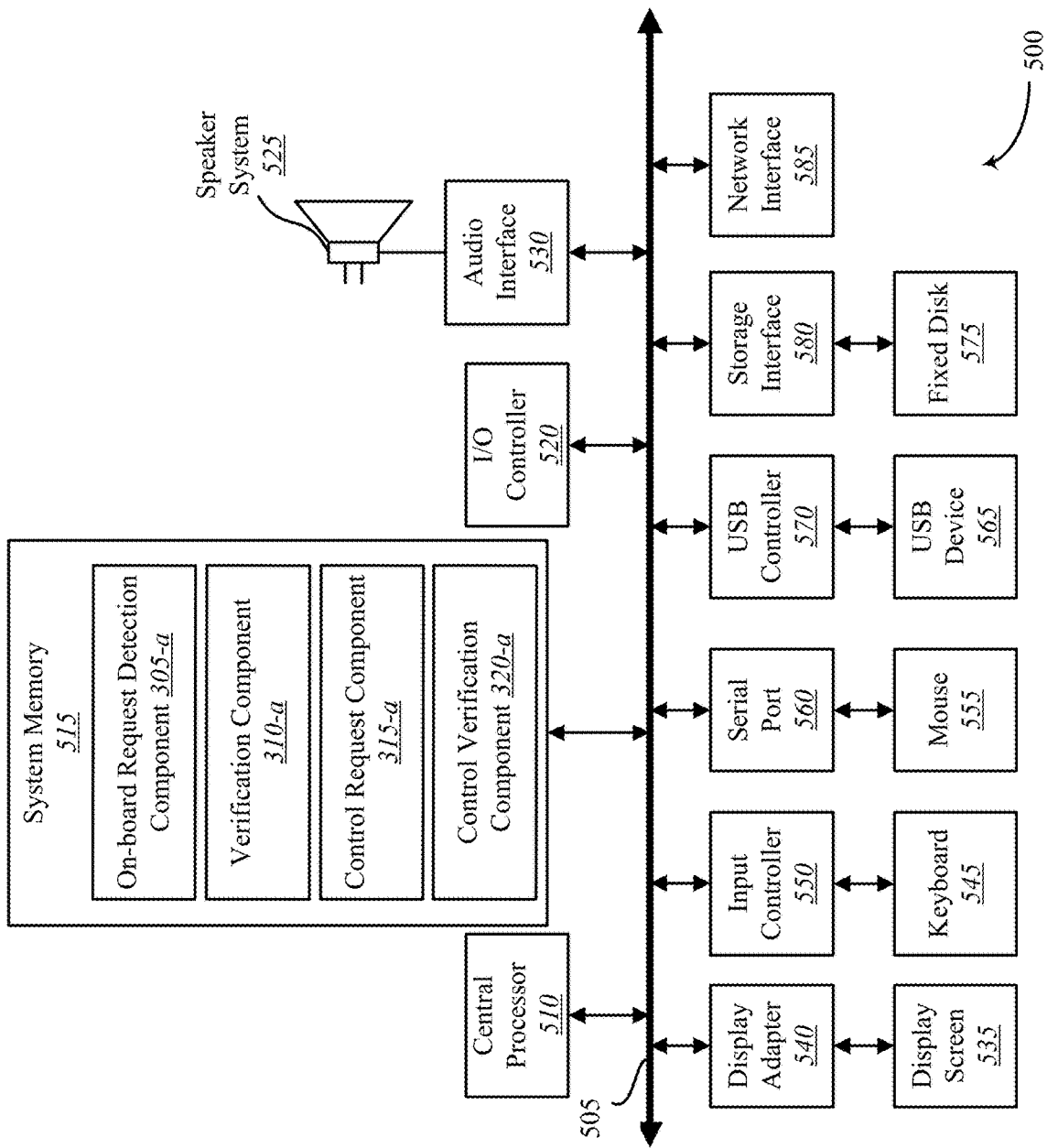
FIG. 5 is a block diagram illustrating embodiments of a system suitable for implementing embodiments of the present systems and methods, in accordance with various aspects of this disclosure.

FIG. 5 depicts a block diagram of a device controller 500 suitable for implementing the present systems and methods. The device controller 500 may be an example of a device, a server, a computing unit, and/or other units. In some examples, device controller 500 may be an example of authorizing device 105 described with respect to FIG. 1. In some embodiments, device controller 500 includes a bus 505 which interconnects components and/or elements of device controller 500 including one or more of: a central processor 510, a system memory 515 (which may include random access memory (RAM), read-only memory (ROM), flash RAM, and/or similar memory), an input/output controller 520, an external audio device, such as a speaker system 525 via an audio output interface 530, an external device, such as a display screen 535 via display adapter 540, an input device 545 (e.g., remote control device interfaced with an input controller 550), a USB device 565 (in some cases interfaced with a USB controller 570), and a storage interface 580. Also included are at least one sensor 555 connected to bus 505 through a sensor controller 560 and a network interface 585 (in some cases coupled directly to bus 505).

Bus 505 allows data communication between central processor 510, system memory 515 (which may include ROM, flash memory, RAM, and/or similar memory, as previously noted), and/or other elements. One type of memory, such as RAM, may be the main memory into which the operating system and application programs are loaded. The ROM and/or the flash memory can contain, among other code, the Basic Input-Output system (BIOS) that controls basic hardware operation such as the interaction with peripheral components or devices. For example, the different components (e.g., communication, identification, modification, generation, determination, analysis, feedback, and/or others) to implement the present systems and methods may be stored within the system memory 515. Applications resident with device controller 500 are generally stored on and accessed via a non-transitory computer readable medium, such as a hard disk drive (e.g., fixed disk 575) and/or other storage medium. Additionally, applications can be in the form of electronic signals modulated in accordance with the application and data communication technology when accessed via network interface 585.

In some examples, system memory 515 may include one or more of an on-board request detection component 305-*a*, a verification component 310-*a*, a control request component 315-*a*, and/or a control verification component 320-*a*, each of which may be examples of the corresponding components as described with reference to FIG. 3.

Storage interface 580, as with the other storage interfaces of device controller 500, can connect to a standard computer readable medium for storage and/or retrieval of information—such as a fixed disk 575. Fixed disk 575 may be a part of device controller 500 or may be separate and accessed through other interface systems. Network interface 585 may provide a direct connection to a remote server via a direct network link to the Internet via a POP (point of presence). Network interface 585 may provide such connection using wireless techniques, including digital cellular telephone connection, Cellular Digital Packet Data (CDPD) connection, digital satellite data connection, or the like. In some embodiments, one or more sensors (e.g., device sensors, network sensors, system sensors, authentication sensors, communication sensors, and/or power sensors, etc.) connect to device controller 500 wirelessly via network interface 585.

Many other devices or subsystems may be connected in a similar manner (e.g., computing device, remote devices, transmitters, etc.). In addition, all of the devices shown in FIG. 5 need not be present to practice the disclosed systems and methods. The devices and subsystems may be interconnected in different ways from that shown in FIG. 5. Some aspects of some operations of a system, such as that shown in FIG. 5, may be readily known in the art and are not discussed in detail in this application.

Code to implement the present disclosure can be stored in a non-transitory computer-readable medium such as one or more of system memory 515 or fixed disk 575. The operating system(s) provided on device controller 500 may be iOS®, ANDROID®, MS-DOS®, MS-WINDOWS®, OS/2®, UNIX®, LINUX®, and/or another operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiments may be characterized as communicated from one block to the next, other embodiments of the present systems and methods may include modified signals in place of such directly communicated signals as long as the informational and/or functional aspect of the signal is communicated between blocks. To some extent, a signal input at a second block can be conceptualized as a second signal derived from a first signal output from a first block due to physical limitations of the circuitry involved (e.g., there will inevitably be some attenuation and delay). Therefore, as used here, a second signal derived from a first signal includes the first signal and/or any modifications to the first signal—whether due to circuit limitations or due to passage through other circuit elements which do not change the informational and/or final functional aspect of the first signal.

Figure 6:
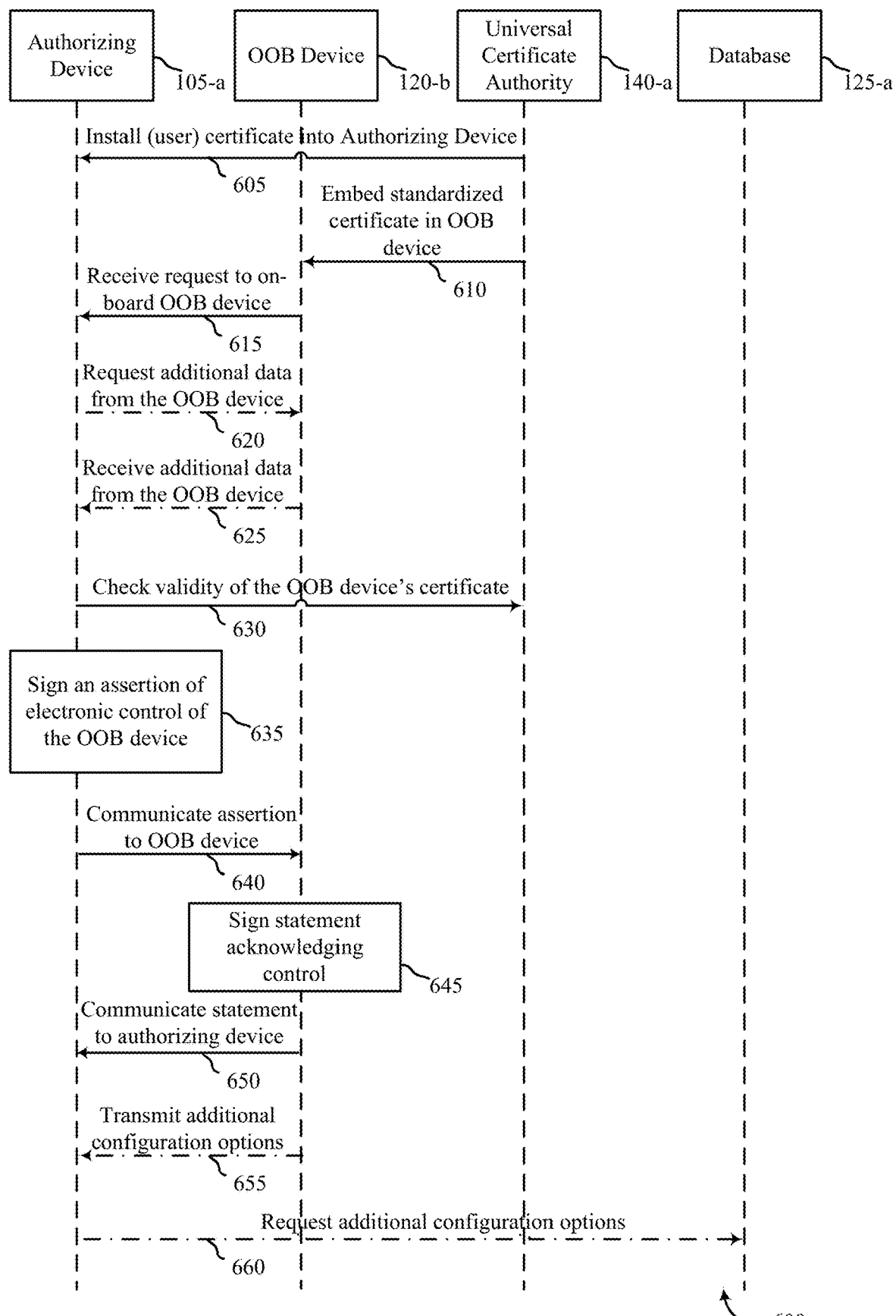
FIG. 6 shows a diagram of a device communication chart in accordance with various aspects of this disclosure.

FIG. 6 shows a diagram of a device communication flow 600 in accordance with various aspects of this disclosure. As depicted, the device communication flow 600 may include database 125-*a*, universal certificate authority 140-*a*, OOB device 120-*b*, and/or authorizing device 105-*a*, which may be examples of components having corresponding reference numbers, as depicted in FIGS. 1 and 4.

As shown, at block 605, universal certificate authority 140-*a* may install a user certificate into the authorizing device 105-*a*. This user certificate may include a globally unique identifier (GUID), and may be signed by a central organization such as a root certificate authority. This user certificate may include roots of trust for determining whether the certificate is valid, where the roots may be embedded similarly to the method by which web browsers embed root certificates, and may support either a singular root or a plurality of roots. This user certificate may be useful, for example, where the authorizing device 105-*a* asserts electronic control over the OOB device 120-*b*. Upon assertion of this control, the OOB device 120-*b* may sign an acknowledgement available to anyone requesting information as to whether the device is controlled, and by whom. Where OOB device 120-*b* represents itself as a bound or controlled device, the OOB device 120-*b* may offer the user certificate, including the GUID, of the controlling party.

At block 610, universal certificate authority 140-*a* may embed a standardized certificate in the OOB device 120-*b*. In some embodiments, this standardized certificate may be embedded in the OOB device 120-*b* at the time of manufacturing, and may be unique to each individual OOB device 120-*b*. Unlike typical manufacturer-embedded certificates, this standardized certificate may be linked to a trusted universal certificate authority 140-*a*, and may provide verifiable identification of the OOB device 120-*b*.

As shown, at block 615, authorizing device 105-*a* may electronically receive a request to on-board from OOB device 120-*b*. For example, authorizing device 105-*a* may detect a short-range broadcast from the OOB device 120-*b*, such as a Bluetooth or un-configured Wi-Fi signal. In some examples, the detected short-range broadcast may be a signed request and may include a standardized certificate associated with the OOB device, communicated to authorizing device 105-*a* from OOB device 120-*b*. In other examples, authorizing device 105-*a* may query OOB device 120-*b* for the standardized certificate. For example, at block 620, authorizing device 105-*a* may request additional data from the OOB device 120-*b*, such as the standardized certificate. At block 625, authorizing device 105-*a* may receive additional data, such as a signed request and the standardized certificate, from the OOB device 120-*b*.

At block 630, authorizing device 105-*a* may verify the validity of the standardized certificate associated with the OOB device 120-*b*. For example, authorizing device 105-*a* may communicate the standardized certificate supplied by OOB device 120-*a* to universal certificate authority 140-*a* for verification. In some examples, universal certificate authority 140-*a* may compare the standardized certificate with a list of verified standardized certificates (e.g., a Certificate Revocation List), for example stored locally or at database 125-*a*, and may validate or invalidate the standardized certificate accordingly. Universal certificate authority 140-*a* may then communicate the validation back to authorizing device 105-*a*. In some examples, this verification may be performed locally by authorizing device 105-*a*, while in other examples, authorizing device 105-*a* will verify the validity of the standardized certificate with universal certificate authority 140-*a*.

At block 635, authorizing device 105-*a* may sign an assertion of electronic control of the OOB device. In some examples, this step may include communicating a policy authority request to electronically control the OOB device 120-*b* from authorizing device 105-*a* to a user. In some examples, presenting the policy authority request may include communicating the policy authority request to a user, and receiving approval of the policy authority request from the user. As previously discussed in more detail with respect to FIG. 4, communicating the policy authority request to a user and receiving approval of the policy authority request may occur locally at authorizing device 105-*a* in some examples, or may be performed remotely from authorizing device 105-*a*, for example at a control panel or other user device, in other examples. Additionally, the approval may be received via direct user input in some examples, or may be provided automatically by authorizing device 105-*a*, for example based on user inputted preferences, or derived preferences based on detected user patterns of behavior.

Authorizing device 105-*a* may then receive approval of the policy authority request, either from direct user input or by automatic approval, as described above. Upon receipt of this approval, authorizing device 105-*a* may assert electronic control over OOB device 120-*b*. In some examples, asserting electronic control may include signing, at authorizing device 105-*a*, an assertion of electronic control of the OOB device 120-*b*, and communicating the assertion of electronic control to the OOB device 120-*b*, as illustrated at blocks 635 and 640. This assertion of electronic control may complete the on-boarding process of the OOB device 120-*b* into electronic control by authorizing device 105-*a*.

At block 645, OOB device 120-*b* may receive the communicated assertion of electronic control from authorizing device 105-*a*, and OOB device 120-*b* may sign a statement acknowledging control. At block 650, OOB device 120-*b* may communicate the signed statement acknowledging control to authorizing device 105-*a*.

In some examples, OOB device 120-*b* may transmit additional configuration options to authorizing device 105-*a*, as illustrated at block 655, and, as shown at block 660, authorizing device 105-*a* may subsequently request additional configuration options from database 125-*a*. Database 125-*a* may responsively communicate the additional configuration options to authorizing device 105-*a*.

Figure 7:
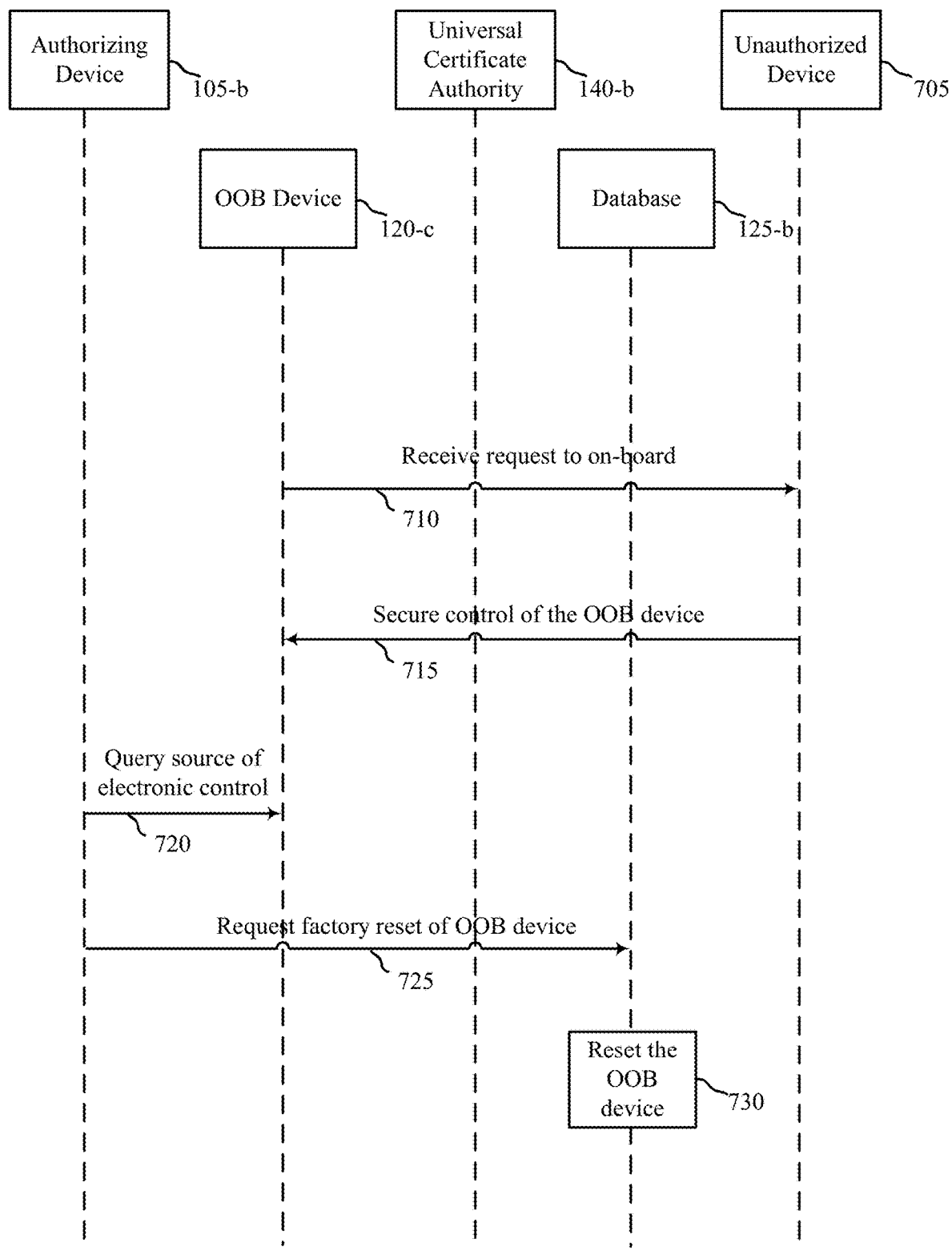
FIG. 7 shows a diagram of a device communication chart in accordance with various aspects of this disclosure.

FIG. 7 shows a diagram of a device communication flow 700 in accordance with various aspects of this disclosure. As depicted, the device communication flow 700 may include database 125-*b*, universal certificate authority 140-*b*, OOB device 120-*c*, and/or authorizing device 105-*b*, which may be examples of components having corresponding reference numbers, as depicted in FIGS. 1 and 4. The device communication flow 700 may additionally include unauthorized device 705, which may include a neighboring device not authorized to assert either malicious or inadvertent control over OOB device 120-c.

In some examples, a race condition may occur, in which multiple devices may attempt to on-board the OOB device 120-b simultaneously. For example, at block 710, unauthorized device 705 may receive a request to on-board from the OOB device 120-c. This may occur because OOB device 120-c broadcasts a short-range Bluetooth or un-configured Wi-Fi signal indiscriminately, requesting on-boarding to any device that may be listening. Unauthorized device 705 may be an example of a personal computing device associated with a residential or commercial neighbor, who might be maliciously or innocently attempting to on-board the OOB device 120-c.

In examples where unauthorized device 705 wins the race condition, unauthorized device 705 may secure electronic control over OOB device 120-c, as described at block 715. Any attempts made by authorizing device 105-b to assert electronic control over OOB device 120-b may accordingly be unsuccessful, as asserting electronic control may limit operation of the OOB device to commands received only by the electronic device. Upon failure to assert electronic control, then, at block 720, authorizing device 105-b may query OOB device 120-c for the source of electronic control over OOB device 120-c. OOB device 120-c may supply such electronic control information to authorizing device 105-b.

In examples where electronic control over OOB device 120-c was falsely or mistakenly asserted, a user associated with authorizing device 105-b may petition the manufacturer of OOB device 120-c to return the OOB device 120-c to original factory settings in order to sever the tie between OOB device 120-c and unauthorized device 705. At block 725, this request to factory reset the OOB device 120-c may be communicated to database 125-b. A user may provide purchasing records identifying the manufacturer embedded standardized certificate associated with OOB device 120-c as corroborating proof of ownership. At block 730, database 125-b may reset OOB device 120-c. Once the OOB device 120-c is returned to factory settings, the authorizing device 105-b may repeat the on-boarding process, as described above with reference to FIG. 6, where authorizing device 105-b may detect a request to on-board from OOB device 120-c.

Figure 8:
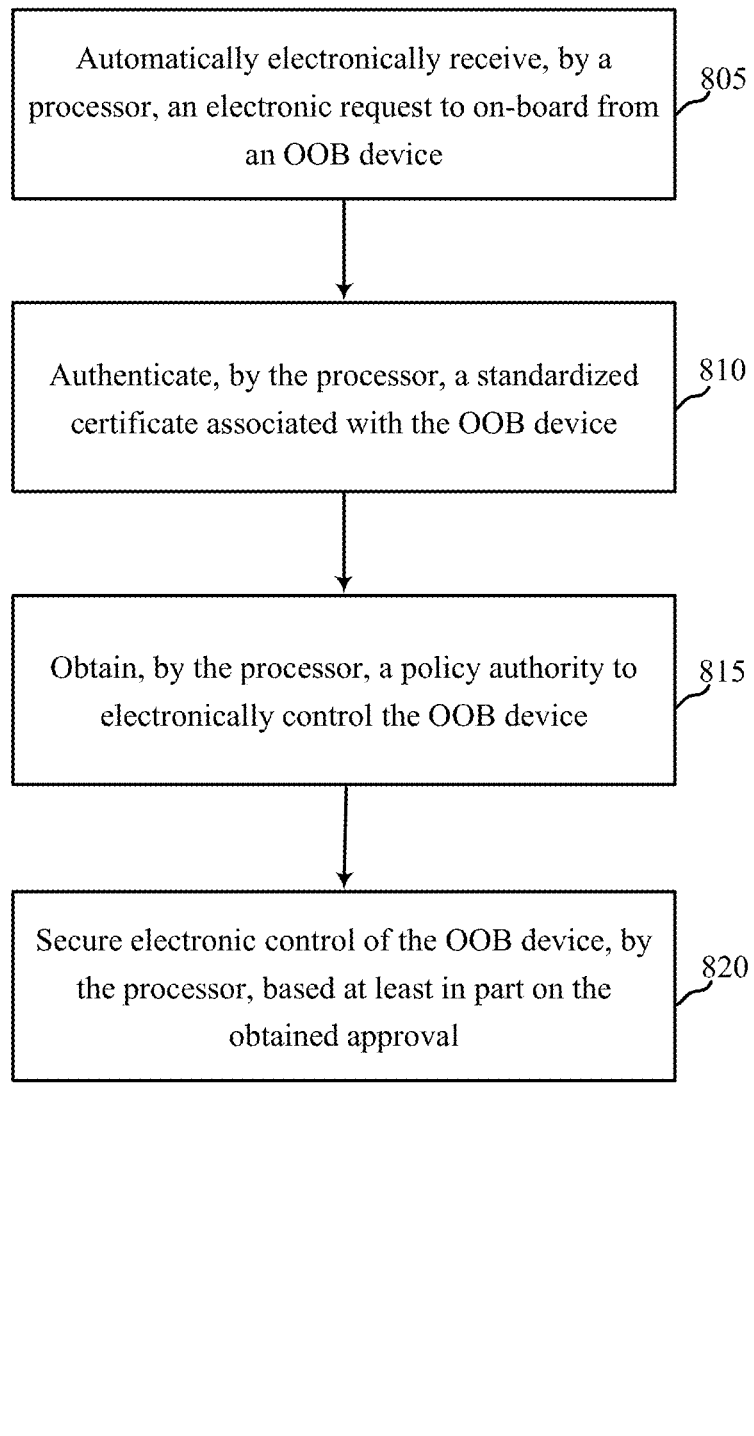
FIG. 8 is a flow chart illustrating embodiments of methods and techniques relating to on-boarding an OOB IoT device, in accordance with various aspects of this disclosure.

FIG. 8 is a flow chart illustrating an example of a method 800 for on-boarding an OOB device to electronic control, in accordance with various aspects of the present disclosure. For clarity, the method 800 is described below with reference to aspects of one or more of the authorizing device 105, OOB device 120, 120-a, and/or device 205, 205-a described with reference to FIGS. 1-4 (among others), and/or aspects of one or more of the on-boarding component 215, 215-a (among others) described with reference to FIGS. 3 and 4. In some embodiments, a device may execute one or more sets of codes to control the functional elements of the device to perform the functions described below. Additionally or alternatively, a server, a device, and/or a computing unit may perform one or more of the functions described below using special-purpose hardware.

At block 805, the method 800 may include automatically electronically receiving, by a processor over, an electronic request to on-board from an OOB device. At block 810, the method 800 may include authenticating, by the processor, a standardized certificate associated with the OOB device. At block 815, the method 800 may include obtaining, by the processor, a policy authority to electronically control of the OOB device. At block 820, the method 800 may include securing electronic control of the OOB device, by the processor, based at least in part on the obtained approval.

In some embodiments, the operations at each of blocks 805-820 may be performed using the on-boarding component 215 and/or 215-a described with reference to FIGS. 3 and 4, among others.

Thus, the method 800 may provide for identifying a request for on-boarding an OOB device to electronic control sent from the OOB device to any listening personal computing device, and implementing electronic control of the OOB device by the personal computing device accordingly. It should be noted that the method 800 is just one implementation and that the operations of the method 800 may be rearranged, omitted, and/or otherwise modified such that other implementations are possible.

Figure 9:
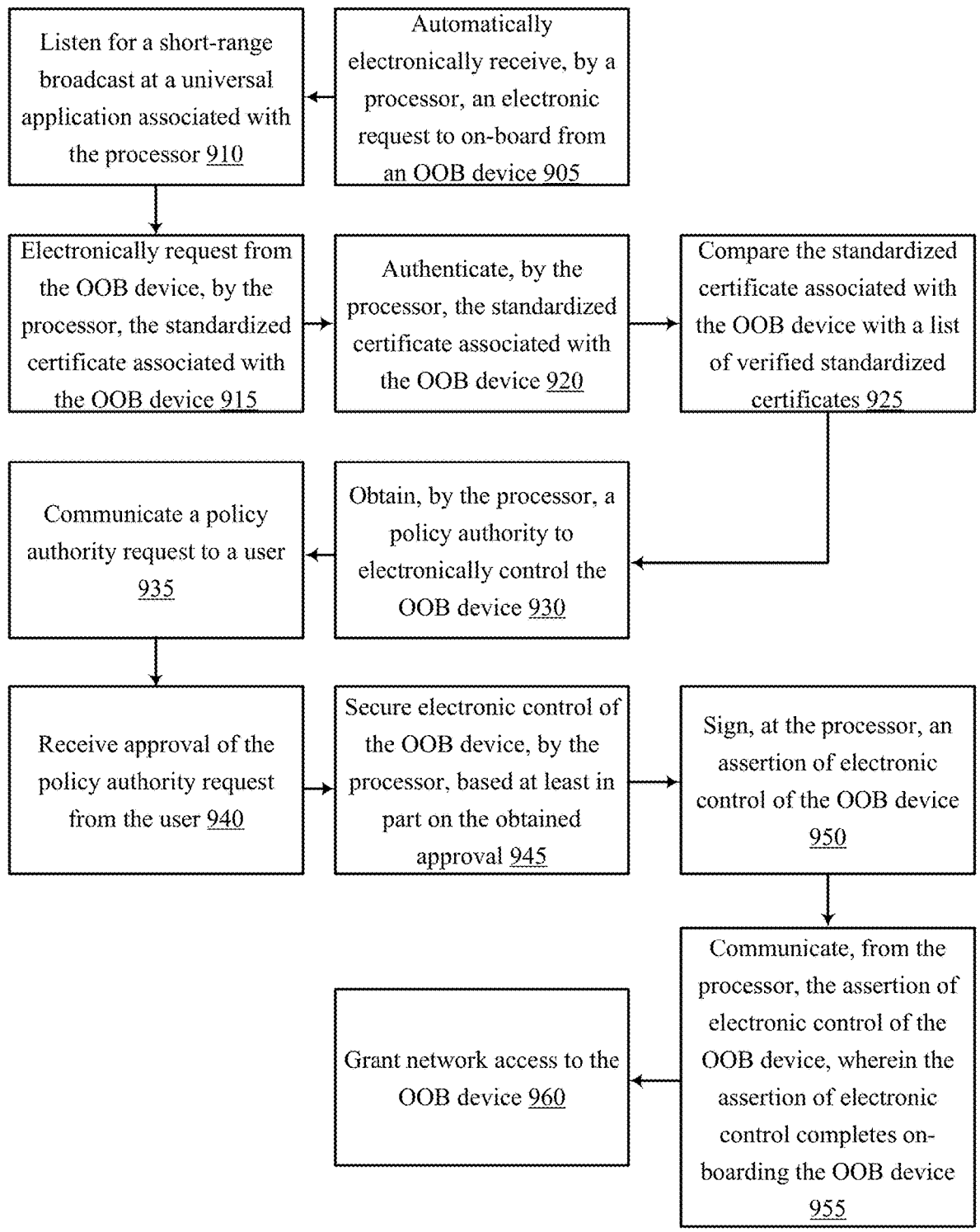
FIG. 9 is a flow chart illustrating embodiments of methods and techniques relating to on-boarding an OOB IoT device, in accordance with various aspects of this disclosure.

FIG. 9 is a flow chart illustrating an example of a method 900 for on-boarding an OOB device to electronic control, in accordance with various aspects of the present disclosure. For clarity, the method 900 is described below with reference to aspects of one or more of the authorizing device 105, OOB device 120, 120-a, and/or device 205, 205-a described with reference to FIGS. 1-4 (among others), and/or aspects of one or more of the on-boarding component 215, 215-a (among others) described with reference to FIGS. 3 and 4. In some embodiments, a device may execute one or more sets of codes to control the functional elements of the device to perform the functions described below. Additionally or alternatively, a server, a device, and/or a computing unit may perform one or more of the functions described below using special-purpose hardware.

At block 905, the method 900 may include automatically electronically receiving, by a processor, an electronic request to on-board from an OOB device. At block 910, the method 900 may include listening for a short-range broadcast at a universal application associated with the processor. At block 915, the method 900 may include electronically requesting from the OOB device, by the processor, the standardized certificate associated with the OOB device. At block 920, the method 900 may include authenticating, by the processor, the standardized certificate associated with the OOB device. At block 925, the method may include comparing the standardized certificate associated with the OOB device with a list of verified standardized certificates. At block 930, the method 900 may include obtaining, by the processor, a policy authority to electronically control the OOB device 930. At block 935, the method 900 may include communicating a policy authority request to a user. At block 940, the method 900 may include electronically receiving, at the processor, approval of the policy authority request from the user. At block 945, the method 900 may include securing electronic control of the OOB device, by the processor, based at least in part on the obtained approval. At block 950, the method 900 may include signing, at the processor, an assertion of electronic control of the OOB device. At block 955, the method 900 may include communicating, from the processor, the assertion of electronic control to the OOB device, where the assertion of electronic control may complete on-boarding the OOB device. At block 960, the method 900 may include granting network access to the OOB device.

In some embodiments, the operations at each of blocks 905-960 may be performed using the on-boarding component 215 and/or 215-a described with reference to FIGS. 3 and 4, among others.

Thus, the method 900 may provide for on-boarding an OOB device to electronic control by verifying a standardized certificate associated with OOB device using a backend standardization authority. It should be noted that the method 900 is just one implementation and that the operations of the method 900 may be rearranged, omitted, and/or otherwise modified such that other implementations are possible.

In some examples, aspects from one or more of the methods 800 and 900 (among others) may be combined and/or separated. It should be noted that the methods 800, 900, etc. are just example implementations, and that the operations of the methods 800, 900, etc. may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium.

For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A method for electronically on-boarding an out of the box (OOB) device so as to secure electronic control of the OOB device, the method being performed by a computing device having an electronic processor, the method comprising:
    electronically receiving a short-range broadcast from the OOB device at a universal application associated with the processor to on-board the OOB device to a secure network;
    electronically requesting from the OOB device a certificate that is linked to a trusted universal certificate authority to provide verifiable identification of the OOB device;
    in response to the request for the certificate, electronically receiving the certificate from the OOB device;
    authenticating, by the processor, the certificate associated with the OOB device by validating the identification of the OOB device;
    obtaining, by the processor, a policy authority to electronically control the OOB device; and
    securing electronic control of the OOB device, by the processor, based at least in part on approval of the policy authority by a user or a pre-determined approval of the policy authority to on-board the OOB device to the secure network.

2. The method of claim 1, wherein the short-range broadcast is received by the processor from the OOB device over a network.

3. The method of claim 1, wherein the short-range broadcast comprises a Bluetooth or un-configured Wi-Fi signal.

4. The method of claim 3, wherein electronically receiving the short-range broadcast from the OOB device to on-board the OOB device further comprises:
    listening for the short-range broadcast at a universal application associated with the processor.

5. The method of claim 1, wherein authenticating the certificate comprises:
    comparing the certificate associated with the OOB device with a list of verified certificates.

6. The method of claim 1, wherein obtaining the policy authority comprises:
    communicating, by the processor, a policy authority request to the user; and
    receiving, by the processor, approval of the policy authority request from the user.

7. The method of claim 6, wherein communicating the policy authority request to the user comprises:
    requesting that the user download an identified application associated with the OOB device.

8. The method of claim 1, wherein securing electronic control of the OOB device comprises:
    signing, at the processor, an assertion of electronic control of the OOB device; and
    communicating, from the processor, assertion of electronic control to the OOB device, wherein the assertion of electronic control completes on-boarding the OOB device.

9. The method of claim 8, wherein on-boarding the OOB device further comprises:
    granting network access to the OOB device.

10. The method of claim 8, wherein securing electronic control of the OOB device further comprises:
    limiting operation of the OOB device to commands received via the processor.

11. An apparatus for electronically on-boarding an out of the box (OOB) device so as to secure electronic control of the OOB, comprising:
    a processor;
    a memory in electronic communication with the processor, wherein the memory stores computer readable executable instructions that when executed by the processor cause the processor to:
    electronically receive a short-range broadcast from the OOB device at a universal application associated with the processor to on-board the OOB device to a secure network;
    electronically request from the OOB device a certificate that is linked to a trusted universal certificate authority to provide verifiable identification of the OOB device;
    in response to the request for the certificate, electronically receive the certificate from the OOB device;
    authenticate the certificate associated with the OOB device by validating the identification of the OOB device;
    obtain a policy authority to electronically control the OOB device; and
    secure electronic control of the OOB device based at least in part on approval of the policy authority by a user or a pre-determined approval of the policy authority to on-board the OOB device to the secure network.

12. The apparatus of claim 11, wherein the short-range broadcast is received by the processor from the OOB device over a network.

13. The apparatus of claim 11, wherein the short-range broadcast comprises a Bluetooth or un-configured Wi-Fi signal.

14. The apparatus of claim 13, wherein the instructions to electronically receive the short-range broadcast from the OOB device to on-board the OOB device, when executed by the processor, further cause the processor to:
    listen for the short-range broadcast at a universal application associated with the processor.

15. The apparatus of claim 11, wherein the instructions to authenticate the certificate, when executed by the processor, further cause the processor to:
    compare the certificate associated with the OOB device with a list of verified certificates.

16. The apparatus of claim 11, wherein the instructions to obtain the policy authority, when executed by the processor, further cause the processor to:

communicate a policy authority request to the user; and
receive approval of the policy authority request from the user.

17. The apparatus of claim 11, wherein the instructions to secure electronic control of the OOB device, when executed by the processor, further cause the processor to:
sign an assertion of electronic control of the OOB device; and
communicate assertion of electronic control to the OOB device, wherein the assertion of electronic control completes on-boarding the OOB device.

18. A non-transitory computer-readable medium storing code for security and/or automation systems, the code comprising instructions which, when executed by the processor, cause the processor to:
electronically receive a short-range broadcast from the OOB device at a universal application associated with the processor to on-board the OOB device to a secure network;
electronically request from the OOB device a certificate that is linked to a trusted universal certificate authority to provide verifiable identification of the OOB device;
in response to the request for the certificate, automatically electronically receive the certificate from the OOB device;
authenticate the certificate associated with the OOB device by validating the identification of the OOB device;
obtain a policy authority to electronically control the OOB device; and
secure electronic control of the OOB device based at least in part on approval of the policy authority by a user or a pre-determined approval of the policy authority to on-board the OOB device to the secure network.

\* \* \* \* \*